(12) United States Patent
Moon et al.

(10) Patent No.: US 10,598,410 B2
(45) Date of Patent: Mar. 24, 2020

(54) SELF-POWERED, LONG-TERM, LOW-TEMPERATURE, CONTROLLED SHIPPING UNIT

(71) Applicants: William G. Moon, Provo, UT (US); William J. Hancock, Bellevue, WA (US); Steven V. Boyce, Spanish Fork, UT (US); Steven J. Parkinson, Clinton, UT (US)

(72) Inventors: William G. Moon, Provo, UT (US); William J. Hancock, Bellevue, WA (US); Steven V. Boyce, Spanish Fork, UT (US); Steven J. Parkinson, Clinton, UT (US)

(73) Assignee: Reflect Scientific Inc., Orem, UT (US)

(*) Notice: Subject to any disclaimer, the term of this patent is extended or adjusted under 35 U.S.C. 154(b) by 0 days.

(21) Appl. No.: 15/296,012

(22) Filed: Oct. 17, 2016

(65) Prior Publication Data

US 2017/0234583 A1     Aug. 17, 2017

Related U.S. Application Data

(63) Continuation-in-part of application No. 12/464,701, filed on May 12, 2009, now abandoned, and a continuation of application No. 12/574,670, filed on Oct. 6, 2009, now Pat. No. 8,448,454.

(51) Int. Cl.
| | |
|---|---|
| *A61H 33/06* | (2006.01) |
| *F25B 19/00* | (2006.01) |
| *F25D 29/00* | (2006.01) |
| *F16K 49/00* | (2006.01) |
| *F25D 3/10* | (2006.01) |

(52) U.S. Cl.
CPC ............ *F25B 19/005* (2013.01); *F16K 49/00* (2013.01); *F25D 3/105* (2013.01); *F25D 29/001* (2013.01); *F25D 29/003* (2013.01); *F25D 29/006* (2013.01); *F25D 2400/361* (2013.01); *F25D 2700/12* (2013.01)

(58) Field of Classification Search
CPC .. F25B 19/005; F25D 2700/12; F25D 29/001; F25D 29/003
See application file for complete search history.

(56) References Cited

U.S. PATENT DOCUMENTS

| | | | | |
|---|---|---|---|---|
| 3,678,716 A | * | 7/1972 | Cobb .................. | E05B 65/0053 292/179 |
| 4,138,049 A | * | 2/1979 | McAlarney ........... | F25D 23/087 277/629 |
| 4,436,692 A | * | 3/1984 | Stenabaugh ....... | G21C 13/0285 376/204 |

(Continued)

*Primary Examiner* — Henry T Crenshaw
(74) *Attorney, Agent, or Firm* — Tran & Associates

(57) ABSTRACT

A shipping vessel includes a cryogenic tank secured to the shipping foundation; a payload bay to receive products therein; a tube connected to the cryogenic tank and thermally coupled to the payload bay; a housing secured to the shipping foundation, said housing covering the tube and the payload bay to thermally seal the payload bay from outside environment; a controller mounted on the housing and having a sensor to determine temperature in a closed-loop and maintaining a set point within a predetermined range; and an energy storage device coupled to the controller and electronics to provide power for a predetermined shipping period.

15 Claims, 6 Drawing Sheets

(56) References Cited

U.S. PATENT DOCUMENTS

| | | | | |
|---|---|---|---|---|
| 5,163,301 A | * | 11/1992 | Cahill-O'Brien | F25B 41/043 236/78 C |
| 5,217,064 A | * | 6/1993 | Kellow | A61J 1/165 165/254 |
| 5,267,443 A | * | 12/1993 | Roehrich | B60H 1/3202 62/167 |
| 5,660,046 A | * | 8/1997 | de Langavant | F25D 3/105 62/239 |
| 5,819,550 A | * | 10/1998 | Saia, III | B66C 1/16 62/239 |
| 6,789,391 B2 | * | 9/2004 | Graham | F25D 3/105 62/223 |
| 7,392,953 B2 | * | 7/2008 | Chu | G06K 17/0022 235/380 |
| 2002/0036137 A1 | * | 3/2002 | Slater | G01N 27/404 204/415 |
| 2002/0124585 A1 | * | 9/2002 | Bash | F25B 5/02 62/228.4 |
| 2003/0051486 A1 | * | 3/2003 | Ursan | F04B 15/08 62/50.6 |
| 2003/0086338 A1 | * | 5/2003 | Sastry | G06F 19/3462 368/10 |
| 2004/0113783 A1 | * | 6/2004 | Yagesh | G06Q 10/08 340/568.1 |
| 2005/0070848 A1 | * | 3/2005 | Kim | A61M 5/2053 604/140 |
| 2005/0126630 A1 | * | 6/2005 | Swan | E03B 7/12 137/80 |
| 2005/0232747 A1 | * | 10/2005 | Brackmann | B60P 3/14 414/803 |
| 2006/0202042 A1 | * | 9/2006 | Chu | G06K 17/0022 235/492 |
| 2013/0333396 A1 | * | 12/2013 | Handley | F17C 9/02 62/48.1 |
| 2013/0340444 A1 | * | 12/2013 | Bryant | B60H 1/00964 62/62 |

* cited by examiner

SELF-POWERED, LONG-TERM, LOW-TEMPERATURE, CONTROLLED SHIPPING UNIT

FIELD OF INVENTION

The present invention relates to low and extremely low temperature shipping containers.

BACKGROUND OF THE INVENTION

Currently there are shipping freezers on the market that keep the customer's products at a low temperature. However, these prior art shipping freezers have severe limitations, such as lack of temperature control, the need for continual external power, flammable fuels, limited shipping durations, etc.

One prior art method of cooling is through the use of blocks of solid Carbon Dioxide, which sublimates at −78 deg. C. Another method of cooling is by pouring liquid Nitrogen, which liquefies at −196 deg C., into the payload bay and surrounding the customer's product.

In both cases, there is the drawback that the customer's product will be cooled to near the temperature of the energy source: −78 deg. C. for Carbon Dioxide, and −196 deg. C. for liquid Nitrogen. Those temperatures are not controllable and may be detrimental to the product.

Yet another method of cooling is with a mechanical means that requires large amounts of electricity to power the compressors. These units usually require an outside power source during shipping. Many times this power is not available or is of limited amounts. Further, some mechanical freezers have a large Diesel generator. Drawbacks of conventional solutions may include one or more of the following: 1. Large volume of Diesel fuel required. 2. Danger of a toxic and flammable fuel. 3. Danger of harmful emissions from the exhaust gas. 4. Reliability concerns of continual operation of the Diesel engine and the plurality of wearing parts.

SUMMARY

In one aspect, a shipping vessel includes a cryogenic tank secured to the shipping foundation; a payload bay to receive products therein; a tube connected to the cryogenic tank and thermally coupled to the payload bay; a housing secured to the shipping foundation, said housing covering the tube and the payload bay to thermally seal the payload bay from outside environment; a controller mounted on the housing and having a sensor to determine temperature in a closed-loop and maintaining a setpoint within a predetermined range; and an energy storage device coupled to the controller and electronics to provide power for a predetermined shipping period.

In another aspect, a shipping containment vessel includes a payload bay; a tubing coupled to the payload bay for cooling when liquid nitrogen coolant flows therethrough; a thermal box housing the payload bay and the tubing to thermally seal the payload bay from outside environment; a cryogenic tank for storing liquid nitrogen coolant; an electronic controller that maintains a setpoint for the payload bay; and a shipping pallet coupled to the cryogenic tank, the thermal box, and the controller.

Advantages of the system may include one or more of the following. The solution has many advantages compared to state of the art freezers. The system provides a relatively large payload bay. The system provides controllable temperature that can be set to a wide range of between 20 deg C. and −150 deg C. The system provides an onboard power source that operates independently of any external power for the entire shipment. The system supports a shipping duration of 10+ days. Non-combustible fuel is used, improving safety. Further, the preferred embodiment has the potential of being much more reliable than current mechanical shipping units. The system has high mean time between failure (MTBF) rating and has a high reliability since the number of parts that have mechanical wear is orders of magnitude less than with a mechanical freezer. The only parts that wear in the preferred embodiment cooling system are limited to a cryogenic valve plunger and the fan shafts. In contrast, a mechanical freezer has a multiplicity of moving parts that continually wear, associated with the diesel generator and the compressor. Examples are a plurality of pistons, bearing surfaces, crankshafts, camshafts, intake and exhaust valves, fuel injectors, belts, and gears to name a few components that wear. Additionally, the system provides low and extremely low temperature shipping containers that operate independently from external power sources for as long as 10+ days.

DETAILED DESCRIPTION

Figure 1:
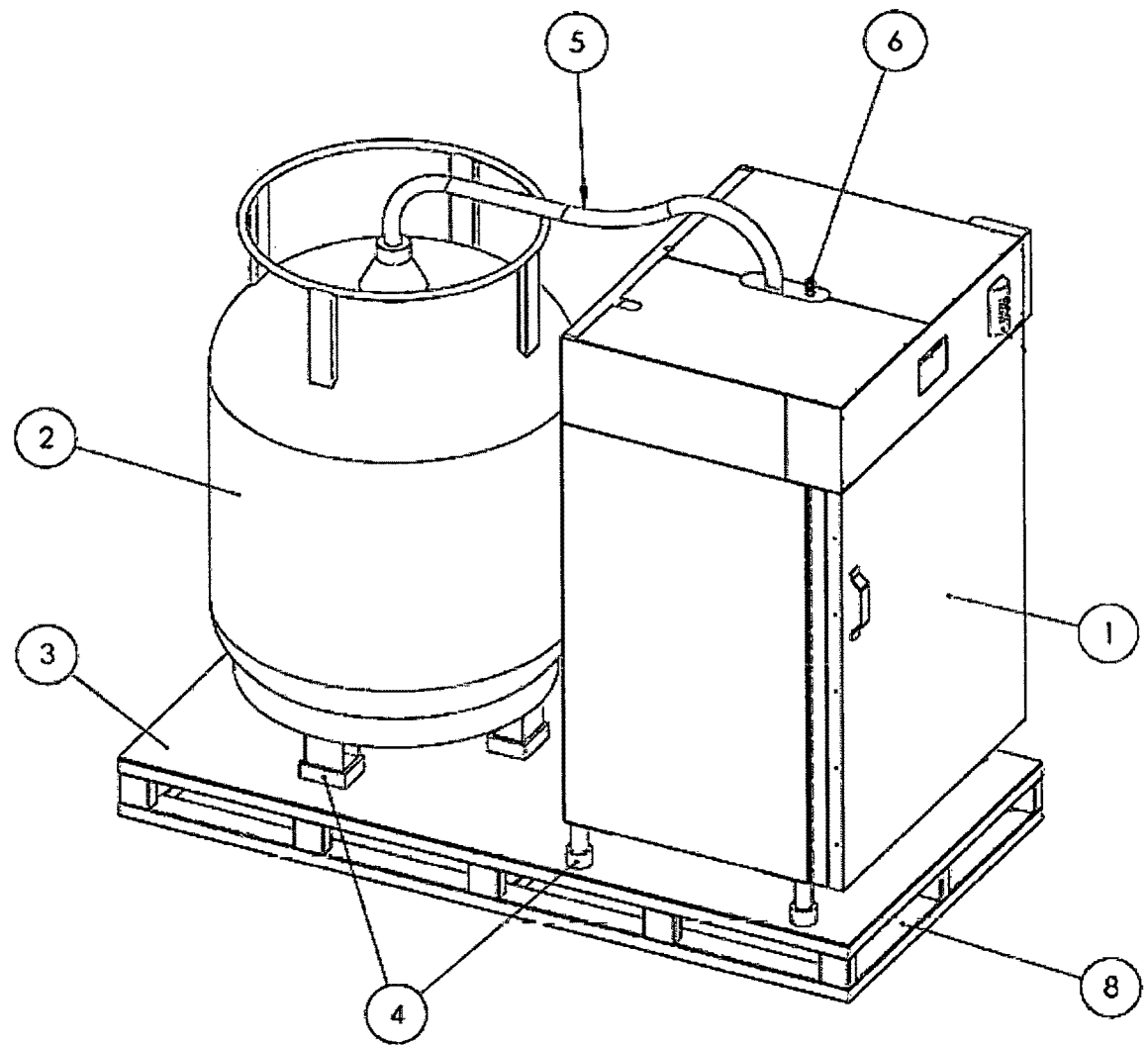
FIG. 1 is an exemplary 3D view of the shipping unit.
Figure 2:
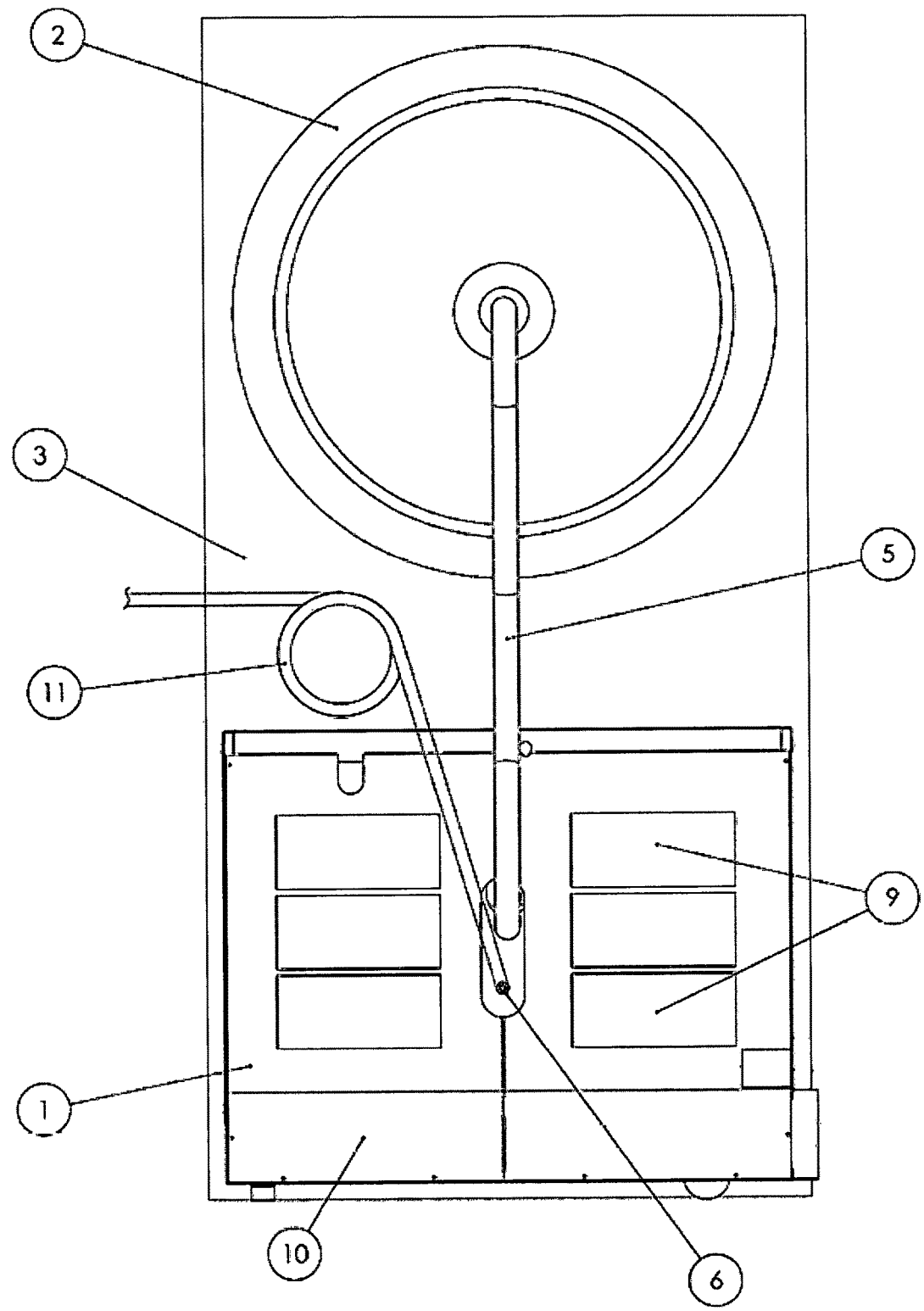
FIG. 2 is an exemplary top view of the shipping unit.
Figure 3:
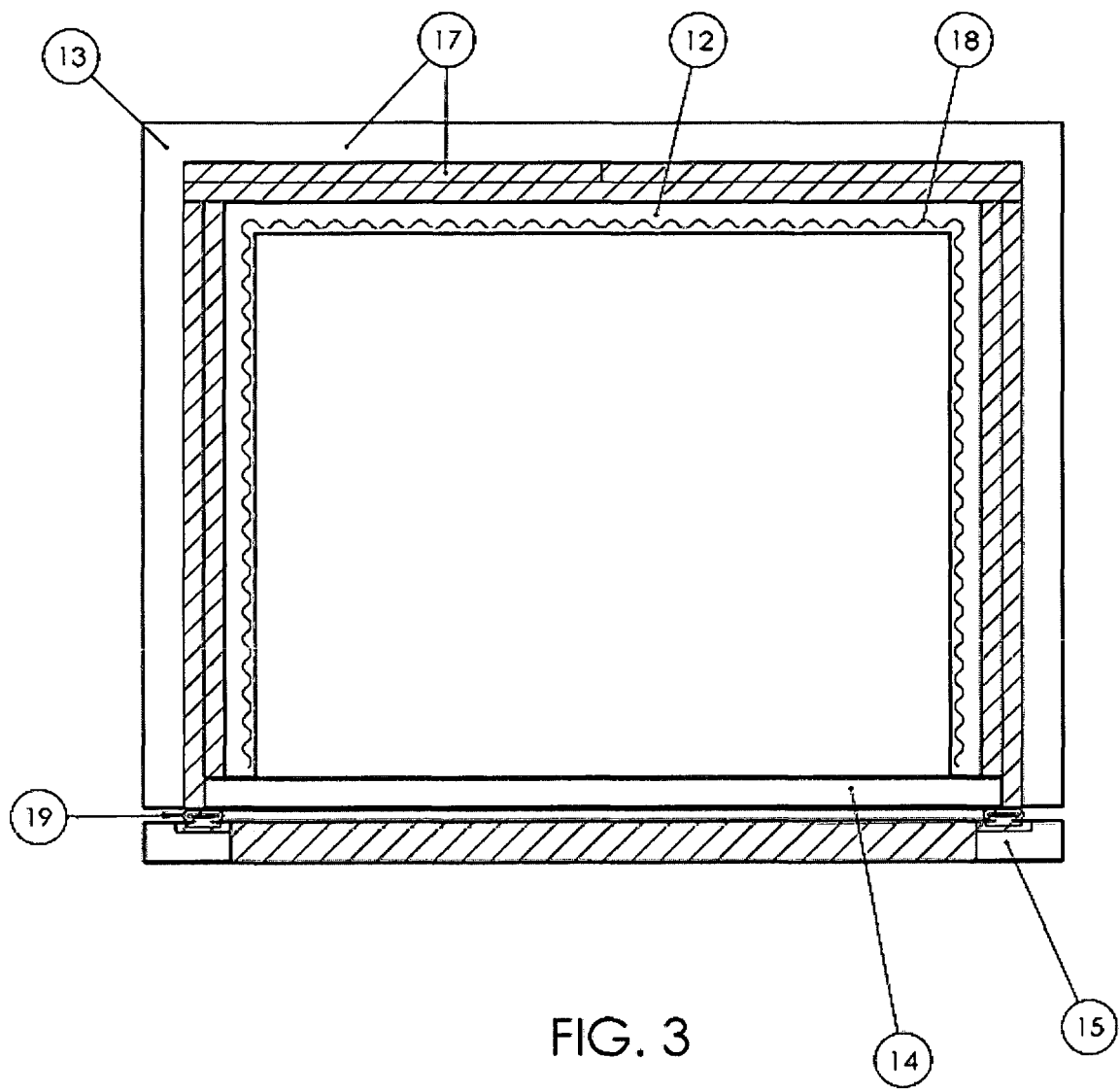
FIG. 3 is an exemplary cross section of the top view of the freezer.

A detailed description of the preferred embodiment is provided herein. It is to be understood, however, that the present invention may be embodied in various forms. Therefore, specific details disclosed herein are not to be interpreted as limiting, but rather as a basis for the claims and as a representative basis for teaching one skilled in the art how to employ the present invention in virtually any appropriately detailed system.

In general, a portable freezer system is disclosed for transporting products, without the need of external power, with shipping times between a few hours and 10+ days, and will reliably maintain an operator defined set point as low as −150 deg. C. The freezer is comprised of a large payload bay, approximately 33.5 cubic feet, a large liquid nitrogen tank for supplying cooling means to the payload bay, an evaporator that encompasses the payload bay and substantially generates cooling, electronics for providing temperature control, rechargeable batteries to provide electrical power to the electronics for the duration of shipping, and a pallet structure capable of supporting all components of the freezer and also providing easy means for movement by standard fork lift methods.

Now referring to FIGS. 1 through 4, this invention is a freezer system comprised of a substantially large cryogenic tank 2, known as a Dewar tank, capable of holding at least 850 liters of liquid Nitrogen in the preferred embodiment, with a daily loss of less than 2% of the fluid in the tank. A vacuum type hose 5 connects the Dewar tank 2 to the freezer housing 1. The hose is connected to 150 feet of copper tubing 18 that surrounds the outside of the payload bay 12 in the preferred embodiment. The copper tube then exits the freezer compartment, where a cryogenic electromagnetic valve 6 controls the coolant flow. A 50 foot hose 11 completes the coolant path.

A plurality of deep cycle batteries 9 power the electronics. Between shipments the batteries are recharged at a 120 VAC power outlet.

During operation, the liquid Nitrogen is under natural pressure due to the characteristics of the Nitrogen. A safety valve, set at 22 psi in the preferred embodiment, maintains the Nitrogen in the tank to that pressure.

A common problem with a safety valve 20 is the extremely cold temperature of the liquid Nitrogen flowing through the valve can, on occasion, cause the valve to stick open. When the valve is stuck open, Nitrogen continues to flow, even after the pressure has dropped to a safe pressure, and the flow of cryogenic fluid should have stopped. The ongoing flow of liquid Nitrogen further drops the valve temperature and substantially increases the potential for a runaway condition that keeps the valves open continuously and needlessly from a safety standpoint, and subsequently wastes large amounts of Nitrogen.

To reduce this problem, heating fins 22 are added to the newly designed safety valve 21. These fins keep the temperature of the valve warmer, during pressure relief, thus reducing the problem of the safety valve sticking.

When the controller calls for cooling, the cryogenic valve opens, thus causing liquid Nitrogen to exit the tank 2, pass through the hose 5 connecting the Dewar to the freezer, flow through the 150 feet of copper tubing 18 and substantially cool the payload bay 12 and all the contents of the compartment. A separate compartment 13, located between the copper tubing and the outside environment, of between 2 and 4 inches thick contains a plurality of insulation materials 17 that substantially reduces the heat loss of the payload bay. A thermocouple inside the payload bay 12, measures the temperature at all times and sends a signal to the controller, where the temperature is carefully monitored and controlled. The payload bay 12 may be set to any temperature between 20 deg. C. and −150 deg. C. When the setpoint has been reached, the controller will stop the flow of liquid Nitrogen through the copper tubing 18 by turning the cryogenic electromagnetic valve off 6. The cryogenic valve 6 controls the Nitrogen flow in a location that is considered unique by those who are familiar with the state of the art. Typically, the control valve is located in the coolant path between the tank 2 and the freezer 1. The valve 6 is located at the exhaust port of the freezer, which provides equivalent control, but provides a substantially warmer environment for the valve, thus increasing the reliability and life of the valve.

The controller 10 then monitors the payload bay 12 temperature via the thermocouple and will use algorithms familiar to those skilled in the art of feedback control systems, such as PID (Proportional-Integral-Derivative) control, to maintain the setpoint within a reasonable limit, such as +/−3 C in the preferred embodiment.

The electronics for the controller 10 uses minimal power. Deep cycle batteries 9 maintain power during the shipment of product to its destination. After arrival, the shipping unit is plugged into a 120 volt AC source to recharge the batteries.

A concern that the exhausting Nitrogen gas may possibly deplete levels of Oxygen for the personnel near the shipper is alleviated by routing the Nitrogen gas through a hose 11, to the outside of the shipping vessel. Should there be a malfunction in porting the hose properly to the outside, an Oxygen Sensor attached to the shipping unit will immediately sound, alerting anyone nearby of the unsafe condition.

Typically, the losses through the payload bay door and gasket comprise a majority of the cooling losses. As a means to reduce the cooling losses, a rubber pneumatic seal 19 is placed between the door 15 and the payload bay 12. The seal is inflated from the Nitrogen gas that is readily available at all times, since it is a byproduct of the cooling process. A further reduction in cooling losses is accomplished with an additional impediment to the heat flow by adding a second door 14 interior to the main door 15.

To provide ease of transporting the shipping containment vessel between shipping docks and various modes of transportation, a pallet 3 supports all components of the vessel. The pallet support structure is designed in a manner that provides convenient access 8 for the forks of a forklift.

The entire shipping containment vessel may be subjected to large shocks and vibrations during shipment. Ground transportation, usually provided by semi-trailers, is particularly damaging near the front of the semi-trailer on rough roads. Frequencies between 2 hz and 25 hz, with accelerations between 0.5 and 1.6 g's are transmitted to loads, which can cause vessel damage. However, the tank and freezer are protected from theses shocks and vibrations by isolation dampers 4, which attenuate the shocks and vibrations. Further, the controller 10 has additional isolation dampers to protect the electronics.

Figure 4:
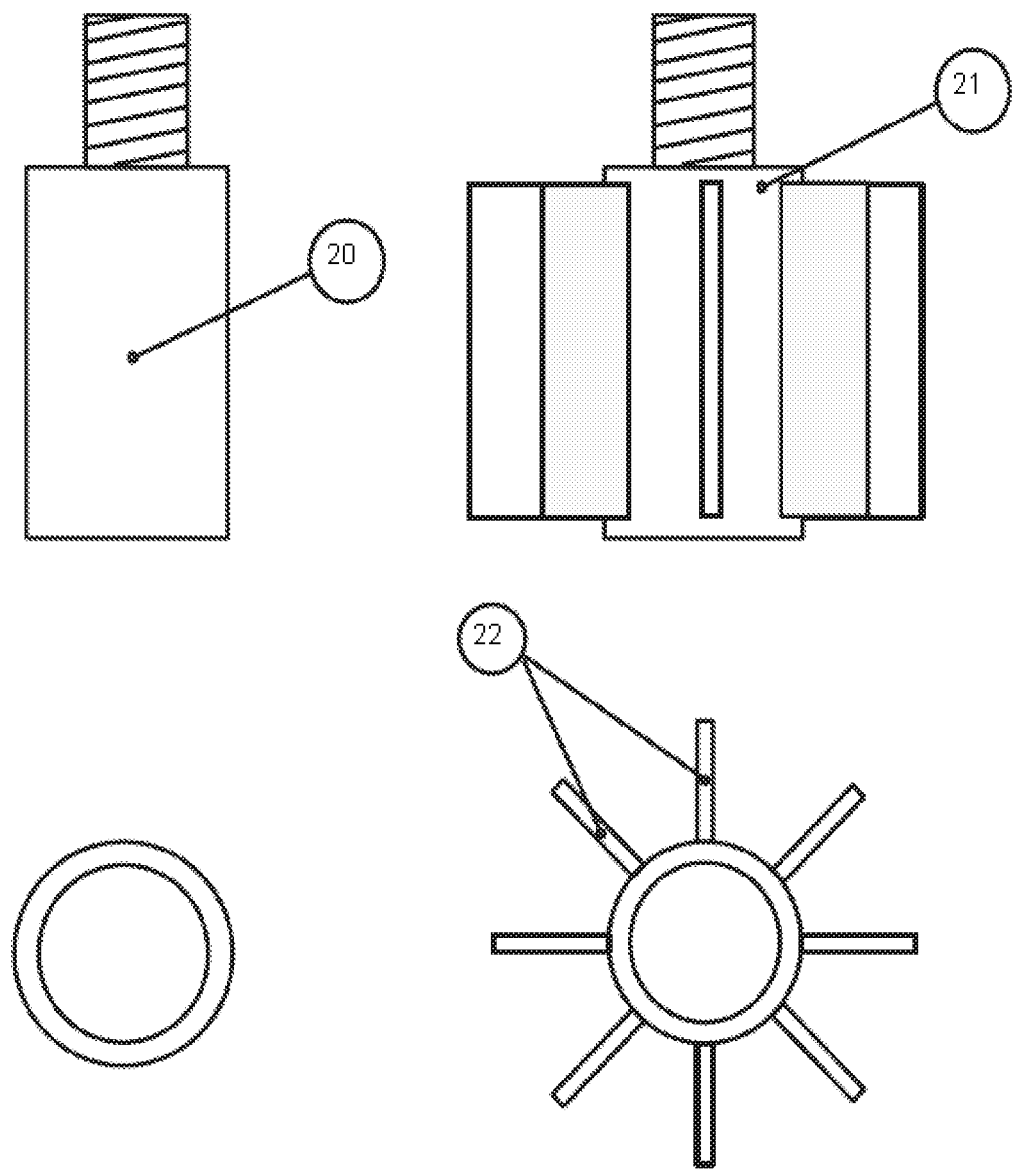
FIG. 4 is an exemplary illustration of safety valve heating fins.

As shown in FIG. 4, safety valves 20 are used to prevent excessive pressures in the system. Said valves are generally used in the industry for this type of application. However, a common problem with the safety valve is that the extremely cold temperature of the liquid Nitrogen flowing through the valve can cause the valve to stick and remain open, when it should have closed. Further, this flow causes the valve temperature to plummet, which substantially increases the potential for a runaway condition, keeping the valve open continuously and needlessly, wasting large amounts of Nitrogen. This failure is known in the industry as "sticky valve".

To reduce this problem, heating fins 22 are added to the newly designed safety valve 21 in the preferred embodiment. These fins 22 keep the temperature of the valve warmer during pressure relief, thus significantly reducing the sticky valve problem.

In one embodiment, a shipping containment vessel includes a payload bay With a length of copper tubing immediately outside the payload bay, which provides cooling when the Nitrogen is flowing: through the copper tubing. A thermal box is placed immediately outside the copper tubing, which effectively thermally seals the payload bay from the outside environment, significantly reducing cooling losses. A cryogenic tank is used for storing liquid nitrogen coolant. An electronic controller maintains a set point for the payload bay, determined by the operator, prior to shipment. A shipping pallet of sufficient size is used to support the cryogenic tank, the freezer, the electronics and all remaining system components independently and autonomously. A pneumatic latch prevents accidental opening of the payload bay compartment door. A pneumatic rubber seal provides an airtight seal for the payload bay. The electronics and mechanics that controls product shipping compartment temperatures consistently within a specified range of the set point throughout the shipment duration. Reliability is increased through a redundant cryogenic valve 25 in parallel with main cryogenic valve 6 and a separate controller and temperature sensor. A mechanical valve 24 is k used in parallel as a third redundancy.

The cryogenic liquid, Nitrogen, does not come in contact with the customer's product or any item in the product storage compartment, but rather has an exhaust with ports 11 outside the payload bay and eliminates the "direct inject" problems. The Nitrogen exhaust gas is routed through a hose that may be ported outside a Semi-trailer, a ship's cargo hold or an airplane. An Oxygen sensor with an alarm can be attached to the assembly, reducing the concern for Oxygen concentration levels below 17%, that might possibly occur in a failure.

The shipping pallet is designed with the appropriate holes to accommodate a fork lift. The copper tubing is protected from extreme pressures with a safety valve. The safety valve has a mechanism to prevent a failure known in the industry as a "sticky valve", through the attachment of heat exchanger fins to the outside diameter of the safety valve.

A pneumatic latch 23 and pneumatic rubber seal 19 are powered by the pressure derived from the Nitrogen exhaust gas 26.

The Nitrogen tank is of sufficient size to provide the payload bay cooling to a specified set point for the shipping duration of 10+ days. The assembly requires no external power of any kind for the duration of the shipping interval. The assembly has a net thermal effect of reducing the temperature of the surrounding environment, rather than increasing the temperature, which occurs with prior art mechanical shipping units.

The electronics includes an interactive Human Machine Interface or HMI. The HMI has a touch screen display. The electronics also includes a data logging system with real time data, plotted on the display and recording temperature and time throughout the shipment. The electronics also includes the capability of transmitting data logging information. The electronics includes a GPS system for tracking location remotely during shipment.

The product shipping compartment temperature control is provided by a cryogenic valve that is precisely controlled by the electronics. Further, the temperature control is achieved through the use of PID or another algorithm known to those skilled in the art.

The entire product is self contained on a pallet and totally energy independent for the duration of shipping.

The cryogenic temperature control valve is placed in the exhaust path of the Nitrogen gas. The location provides a warmer temperature location and promotes longer valve operating life than the standard location that is on the substantially colder incoming side of the freezer.

The entire Nitrogen flow is a closed system and the liquid Nitrogen and the Nitrogen gas never comes in direct contact with the customer's product or the person using it. The system is emission free and contains no polluting refrigerants such as CFCs or HCFCs. The entire cooling system is highly reliable due to almost no moving parts. Preferred embodiment has no engine and no refrigeration compressor, thus alleviating the customer from the wear problems associated with the multiplicity of moving parts in current shipping unit designs.

The shipping pallet supports the cryogenic tank, the freezer, the electronics and all remaining system components independently and autonomously. Mission critical payloads may be protected with an option of an entirely redundant valve, thermostat, and thermal sensor. The operation of the freezer system has the advantage of cooling rather than heating the local environment or shipping container.

Figure 5:
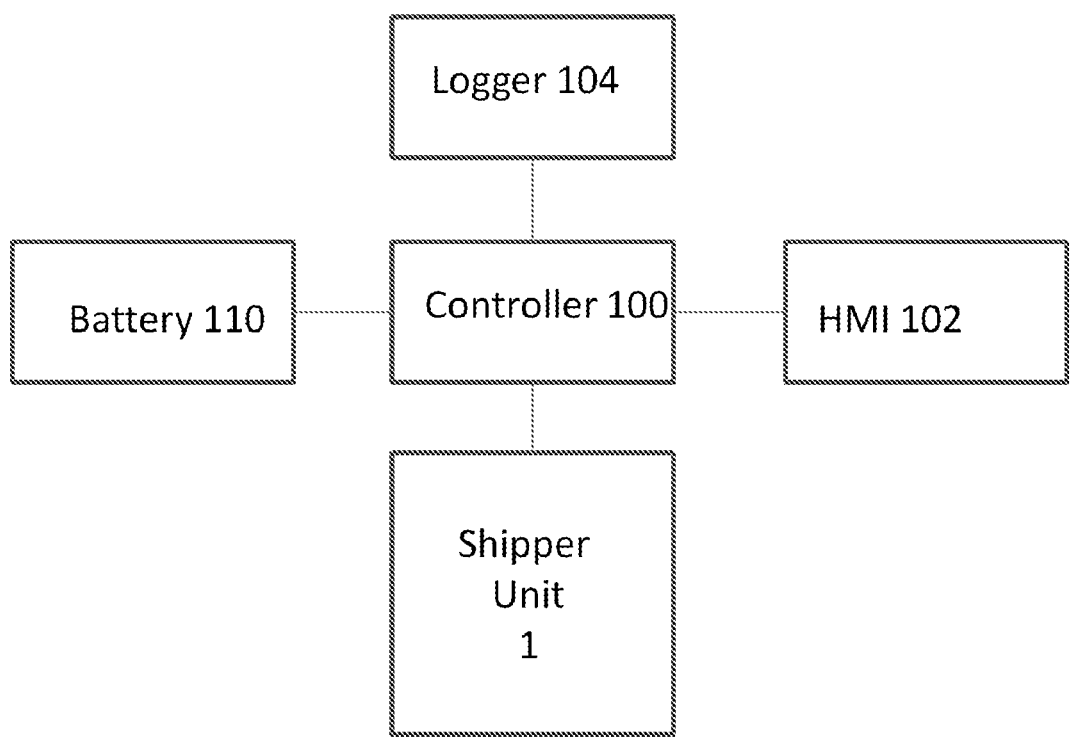
FIG. 5 shows an exemplary control electronics for the shipping unit.
Figure 6:
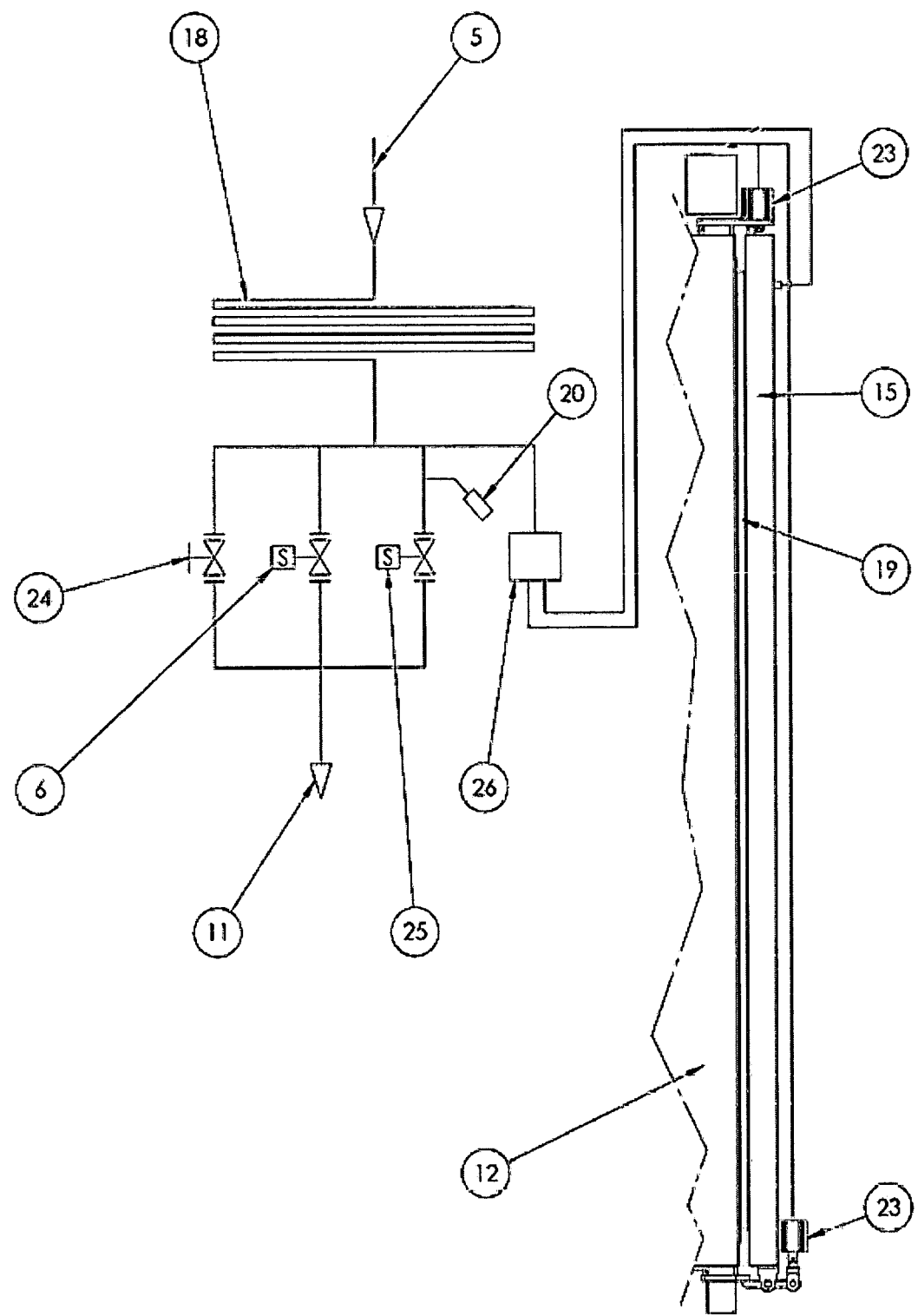
FIG. 6 shows a diagram of redundancy operations in the shipping unit.

FIG. 5 shows an exemplary Shipper with a controller 100 and a battery unit 110 for the shipper unit 1. The control electronics includes an interactive Human Machine Interface or HMI 102. The HMI has a touch screen display. Said electronics also includes a data logging unit 104 with real time data, plotted on the display and recording temperature vs time. The electronics also includes the capability to transmit data logging information. The payload bay temperature control is provided by a cryogenic valve that is precisely controlled by the electronics. Further, said temperature control is achieved through the use of PID or another algorithm known to those skilled in the art. Deep cycle batteries 110 maintain power during the shipment of product to its destination. Additional customer product thermal safety is provided by an emergency mechanical valve that regulates shipper temperature. A pneumatic latch and pneumatic rubber seal can be used and can be powered by the pressure derived from the Nitrogen exhaust gas. The safety valves have a mechanism to prevent a failure known in the industry as a "sticky valve", through the attachment of heat exchanger fins to the outside diameter of said safety valve. The assembly has a net thermal effect of reducing the temperature of the surrounding environment, rather than increasing the temperature, which occurs with prior art mechanical freezers. The cryogenic temperature control valve is placed in the exhaust path of the Nitrogen gas. Said location provides a warmer temperature location and promotes longer valve operating life than the standard location that is on the substantially colder incoming side of the freezer. The system is emission free and contains no polluting refrigerants such as CFCs or HCFCs. The entire cooling system is highly reliable due to almost no moving parts. The entire Nitrogen flow is a closed system and the liquid Nitrogen and the Nitrogen gas never come in direct contact with the customer's product or the employees.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A shipping vessel, comprising:
   a shipping foundation;
   a cryogenic tank secured to the shipping foundation, a payload bay to receive products therein;
   a tube connected to the cryogenic tank and coupled to the payload bay to receive heat from the payload bay;
   a housing secured to the shipping foundation, said housing covering the tube and the payload bay to thermally seal the payload bay from the outside environment;
   a controller mounted on the housing and having a sensor to determine temperature in a closed control-loop using a proportional-integral-derivative (PID) controller to control temperature and maintaining a set point within a predetermined range;
   a cryogenic temperature control valve placed in a gas exhaust path and controlled by the controller and where temperature control is achieved through PID control;
   a door with a pneumatic latch to access the payload bay and a pneumatic rubber seal coupled to the door, wherein the pneumatic rubber seal is powered by the pressure derived from exhaust gas; and
   an energy storage device coupled to the controller to provide power for a predetermined shipping period, wherein the shipping foundation, cryogenic tank and payload bay is moved as a unit during transportation while maintaining the set point.

2. The vessel of claim 1, wherein the shipping foundation comprises a pallet with openings to receive forklift arms.

3. The vessel of claim 1, comprising an exhaust gas hose for porting cryogen gas outside a semi-trailer, a ship's cargo hold, or an airplane.

4. The vessel of claim 1, comprising means for preventing cryogen gas from contacting a customer's product.

5. The vessel of claim 1, comprising an oxygen sensor and an alarm to monitor oxygen concentration.

6. The vessel of claim 1, wherein the tube is protected from high pressure with a safety valve.

7. The vessel of claim 1, wherein the cryogenic tank and payload bay generates a net thermal effect of reducing an outside temperature of the outside environment.

8. The vessel of claim 1, comprising a valve coupled to the tube.

9. The vessel of claim 1, comprising a mechanical valve located in parallel with a valve to manually regulate the freezer temperature.

10. The vessel of claim 1, comprising a safety valve coupled to the cryogenic tank.

11. The vessel of claim 1, comprising heating fins coupled to a valve and to keep the temperature of the valve warmer during pressure relief.

12. The vessel of claim 1, comprising a transceiver to communicate data over the Internet.

13. A shipping containment vessel, comprising:
a payload bay;
a tubing coupled to the payload bay for cooling when liquid nitrogen coolant flows therethrough;
a thermal box housing the payload bay and the tubing to thermally seal the payload bay from outside environment;
an electronic controller that maintains a set point for the payload bay;
a cryogenic temperature control valve in a gas exhaust path and controlled by the controller;
a door with a pneumatic latch to access the payload bay and a pneumatic rubber seal coupled to the door, wherein the pneumatic rubber seal is powered by the pressure derived from exhaust gas; and
a shipping pallet coupled to the cryogenic tank, the thermal box, and the controller, wherein the pallet, cryogenic tank and payload bay is moved as a unit during transportation while maintaining the set point.

14. The shipping containment vessel of claim 13, wherein temperature control is achieved through PID control.

15. The shipping containment vessel of claim 13, comprising a thermal sensor.

* * * * *